United States Patent
Hahn et al.

(10) Patent No.: US 12,019,589 B2
(45) Date of Patent: Jun. 25, 2024

(54) OPTIMIZED AUTONOMOUS DEFRAGMENTATION OF STORAGE DEVICES

(71) Applicant: Western Digital Technologies, Inc., San Jose, CA (US)

(72) Inventors: Judah Gamliel Hahn, Ofra (IL); Alexander Bazarsky, Holon (IL); Michael Ionin, Rehovot (IL)

(73) Assignee: Western Digital Technologies, Inc., San Jose, CA (US)

( * ) Notice: Subject to any disclaimer, the term of this patent is extended or adjusted under 35 U.S.C. 154(b) by 105 days.

(21) Appl. No.: 17/657,455

(22) Filed: Mar. 31, 2022

(65) Prior Publication Data
US 2023/0315689 A1  Oct. 5, 2023

(51) Int. Cl.
   *G06F 12/00* (2006.01)
   *G06F 3/06* (2006.01)
   *G06F 16/17* (2019.01)

(52) U.S. Cl.
   CPC ........ *G06F 16/1724* (2019.01); *G06F 3/0619* (2013.01); *G06F 3/0655* (2013.01); *G06F 3/0679* (2013.01)

(58) Field of Classification Search
   CPC .. G06F 16/1724; G06F 3/0619; G06F 3/0655; G06F 3/0679
   USPC .......................................................... 711/202
   See application file for complete search history.

(56) References Cited

U.S. PATENT DOCUMENTS

| | | | |
|---|---|---|---|
| 2017/0220292 A1* | 8/2017 | Hashimoto | G06F 3/0665 |
| 2020/0409554 A1* | 12/2020 | Srimal | G06F 12/10 |
| 2021/0389876 A1* | 12/2021 | Muthiah | G06F 3/0608 |

\* cited by examiner

*Primary Examiner* — Mardochee Chery
(74) *Attorney, Agent, or Firm* — PATTERSON + SHERIDAN, LLP (57) ABSTRACT

The present disclosure generally relates to determining host device read patterns and then matching autonomous defragmentation to the read pattern to reduce latency impact and avoid unnecessary write amplification (WA). Host devices tend to read data in similar sized chunks. Additionally, host devices tend to read certain data sequentially. Based upon the typical chunk size and data read, the data can be defragmented in sizes to match the typical host device read chunks, and the data defragmented can then be read sequentially within a same plane even if the defragmented data is on different dies. The data is defragmented without relying upon a host command to be presented. Background operation time is used to move updated data such that a future sequential read is supported.

20 Claims, 5 Drawing Sheets

OPTIMIZED AUTONOMOUS DEFRAGMENTATION OF STORAGE DEVICES

BACKGROUND OF THE DISCLOSURE

Field of the Disclosure

Embodiments of the present disclosure generally relate to matching data defragmentation to host read patterns.

Description of the Related Art

In situations where stored data is updated in a data storage device, the data storage device will usually update the logical to physical (L2P) table of the corresponding logical block address (LBA), invalidating the old entry. If the original data was written sequentially, the data stream is now fragmented. Later, the data storage device garbage collection mechanism recycles mostly invalidated blocks in order to free memory.

A coordinated defragmentation operation can be initiated by the host device via simple copy commands. Such a procedure will move the entire fragmented sequential data segment into a new LBA range and thus defragment the data. Such a solution usually incurs unnecessary write amplification (WA) as the defragmentation might not be required to move the entire segment of the data, but rather, to only 'patch' the fragmented data such that the data can be read sequentially.

Another aspect of the issue comes when the host device performs short non-aligned reads in lengths of 64 KB or 32 KB instead of 128 KB. When host device reads are long, the LBA rewrite that is not in line with the other data (i.e., the 'patch') may not be felt in the overall read throughput calculation. However, when the host device reads are short and non-aligned, the extra reads that are imposed by the 'patch' may incur a throughput and quality of service (QoS) penalty.

Therefore, there is a need in the art for predicting host device reads and defragmenting the data to be read to ensure low read latency.

SUMMARY OF THE DISCLOSURE

The present disclosure generally relates to determining host device read patterns and then matching autonomous defragmentation to the read pattern to reduce latency impact and avoid unnecessary write amplification (WA). Host devices tend to read data in similar sized chunks. Additionally, host devices tend to read certain data sequentially. Based upon the typical chunk size and data read, the data can be defragmented in sizes to match the typical host device read chunks, and the data defragmented can then be read sequentially within a same plane even if the defragmented data is on different dies. The data is defragmented without relying upon a host command to be presented. Background operation time is used to move updated data such that a future sequential read is supported.

In one embodiment, a data storage device comprises: a memory device; and a controller coupled to the memory device, wherein the controller is configured to: store sequentially read logical block address (LBA) coordinates in the memory device; mark one or more segments of the sequentially read LBA coordinates as candidates for defragmentation; select one or more candidates from relocation to one or more defragmentation blocks in the memory device; and write the selected one or more candidates to the one or more defragmentation blocks.

In another embodiment, a data storage device comprises: a memory device; and a controller coupled to the memory device, wherein the controller is configured to: monitor a host device's read pattern; record the host device's common data read length pattern; utilize the recorded host device's read length pattern to set defragmentation granularity; and defragment data stored in the memory device.

In another embodiment, a data storage device comprises: memory means; and a controller coupled to the memory means, wherein the controller is configured to: detect a pattern of host device read requests; log host device access rate to data; and defragment the data based upon the detected pattern.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to determining host device read patterns and then matching autonomous defragmentation to the read pattern to reduce latency impact and avoid unnecessary write amplification (WA). Host devices tend to read data in similar sized chunks. Additionally, host devices tend to read certain data sequentially. Based upon the typical chunk size and data read, the data can be defragmented in sizes to match the typical host device read chunks, and the data defragmented can then be read sequentially within a same plane even if the defragmented data is on different dies. The data is defragmented without relying upon a host command to be presented. Background operation time is used to move updated data such that a future sequential read is supported.

Figure 1:
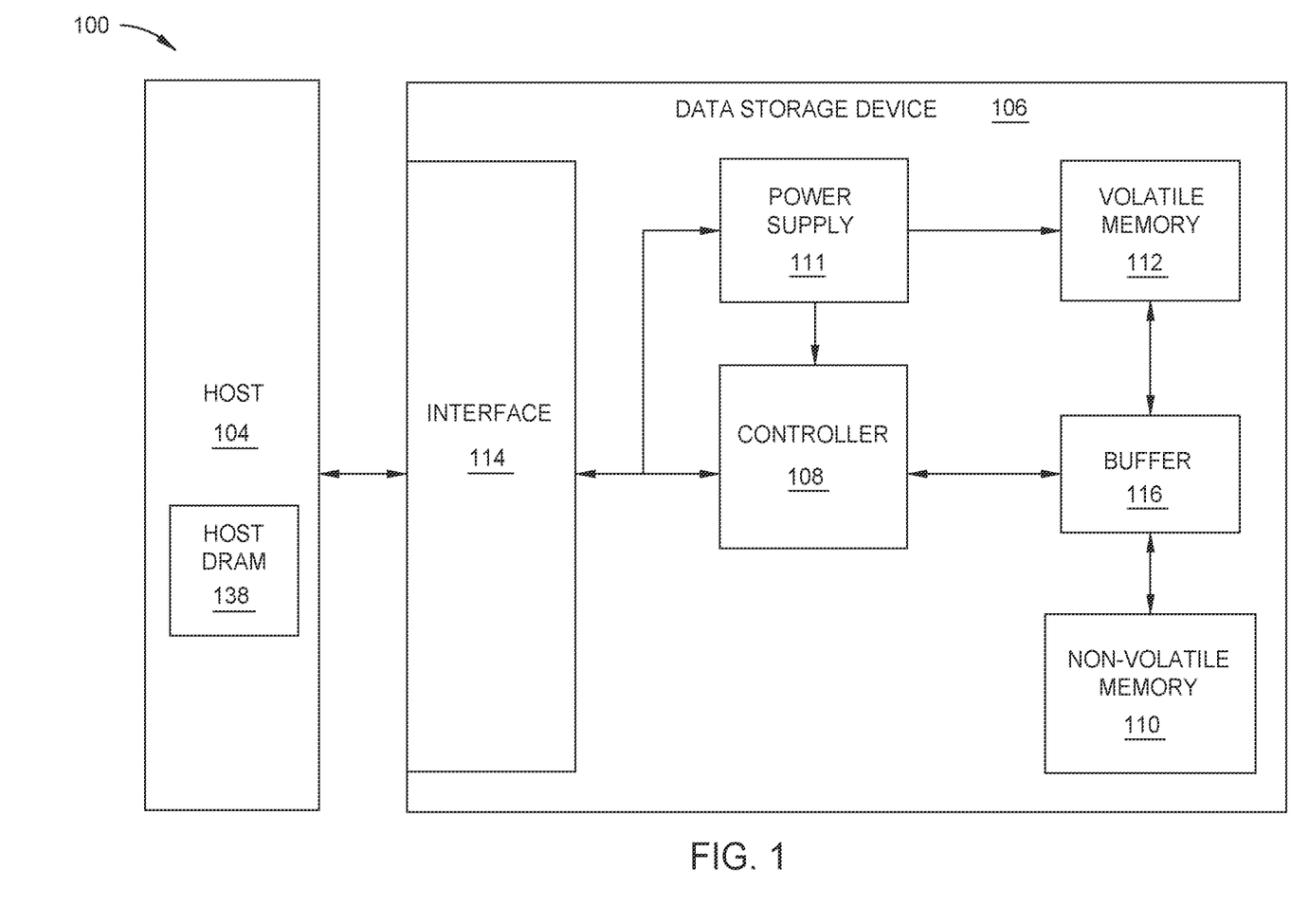
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

As will be discussed below, the embodiments herein present a way to examine the host read pattern and match the autonomous defragmentation according to the read pattern to reduce read latency impacts and avoid unnecessary WA. The data segments are easy to discern when written sequentially, or when a stream ID is used by the host device. However, when patches are later applied without a stream ID (e.g., some host devices do not use stream IDs) it is harder to match the rewritten LBA to the rest of the data segment, which makes it harder to spread the updated data correctly.

Previously, host initiated defragmentation involved rewriting an entire data segment to an empty physical and logical space while data storage device initiated defragmentation involved garbage collection. Garbage collection involves choosing physical blocks that are written with mostly invalid data, copying the valid data into a different physical space, and deleting the chosen physical block to free what was a mostly invalid block. Both the host initiated and the data storage device initiated operations are heavy and do not usually operate during front end background operations (BKOPS) time. The operations also incur significant WA that does not consider the behavior of the current user (e.g., host device in enterprise scenarios) and reading mode. The embodiments discussed herein rely upon identification of rewritten data belonging to an existing data segment and defragmentation of the data. Stated another way, the data storage device organizes the data even without the host device instructed the data storage device to do so or without garbage collection.

Figure 2:
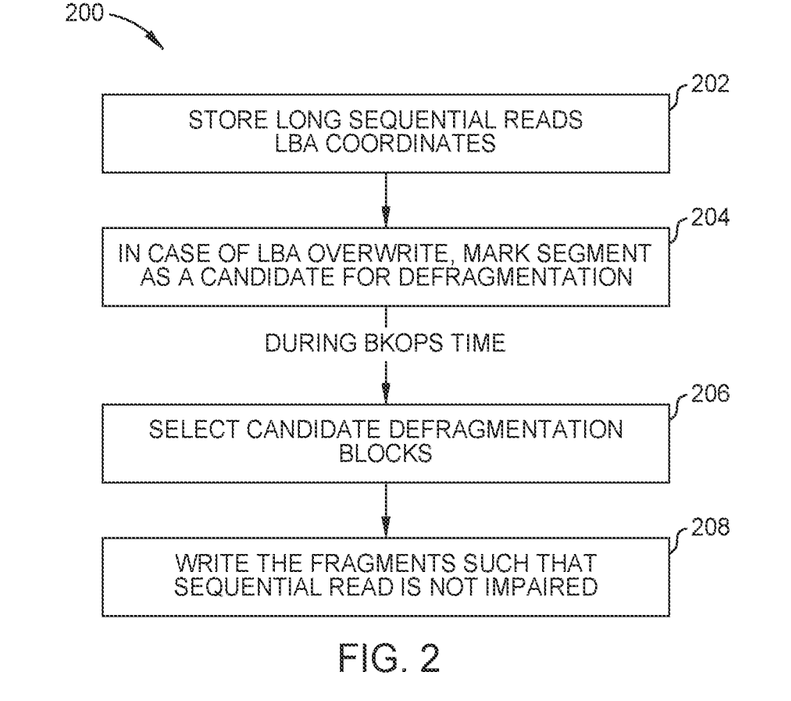
FIG. 2 is flowchart illustrating data defragmentation prediction according to one embodiment.

FIG. 2 is flowchart 200 illustrating data defragmentation prediction according to one embodiment. First, as shown in block 202, storing of segmentation of the data occurs. More specifically, long sequential read LBA coordinates are stored in persistent or non-volatile memory. The long sequential read LBA coordinates are stored as LBA ranges of larger segments where a segment is a portion of data that would typically belong together after a garbage collection or rewrite of data. If the data has been relocated within the data storage device and is hence outdated or has been erased, the data does not need to be moved and in the case of erasure, is no longer in existence to be moved.

In the case of an LBA overwrite, the data storage device will identify and mark the segment that the LBA belongs to in block 204. Candidates for defragmentation blocks are selected in block 206, and the fragments are written to the selected defragmentation blocks at 208 such that sequential read operations are not impaired. If one LBA, which is 4 KB, is overwritten in a large data segment, only the immediate word line (WL) in which the LBA resided should be re-written rather than the entire data segment. The rewriting will occur during BKOPS.

To achieve maximum parallelism, the data, during defragmentation, is spread across different dies. Ideally, the rewritten LBA would reside on the same die and plane that the original LBA occupied. However, when not possible due to other restrictions, consideration of the host device's read behavior comes into play. For example, if the host device reads in chunks of 64 KB, then ideally every sequential 64 KB would be spread across the dies. To tailor the data distribution to the host device read mode, assessment of the specific data segment read mode may be conducted and the defragmentation mode tailored to the specific data segment read mode.

Figure 3:
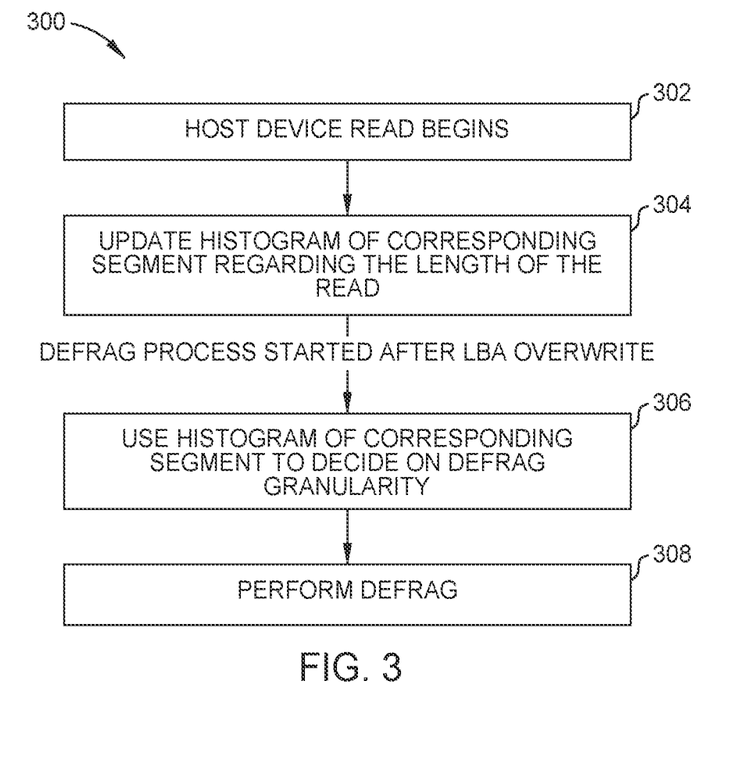
FIG. 3 is a flowchart illustrating use of data tracking in a data defragmentation prediction according to one embodiment.

FIG. 3 is a flowchart 300 illustrating use of data tracking in a data defragmentation prediction according to one embodiment. Here, the controller will monitor the host device's read pattern to record what is the typical data read length that the host device uses. A histogram may be kept for each data segment. Specifically, a host device read begins at 302, and the histogram is updated based upon the host device read at 304. The histogram may indicate the number of reads of each length in some granularity. For example, there may be a breakdown such as <16 KB, 32 KB, 64 KB, 128 KB, >128 KB, <2048 KB, >2048 KB as these are the sizes that would indicate how many WLs should be relocated around the LBA in question. The defragmentation process begins after the LBA overwrite. The histogram of the corresponding segment is used to decide on the defragmentation granularity at 306. The defragmentation occurs at 308.

The timing of the defragmentation operations can also be determined. The timing in which the defragmentation should occur may depend upon the host device behavior. If the host tends to read the rewritten data soon after rewriting the data, the urgency for defragmentation is greater than in the case that the host device doesn't tend to read the data after the data is written within some timeframe. Logging the host device access rate to the rewritten data may be done during the read operation. The logging process may occur after each read, but naturally giving a larger weight for positive indications, or just using the positive indications and wane the positive indication values over time.

Figure 4:
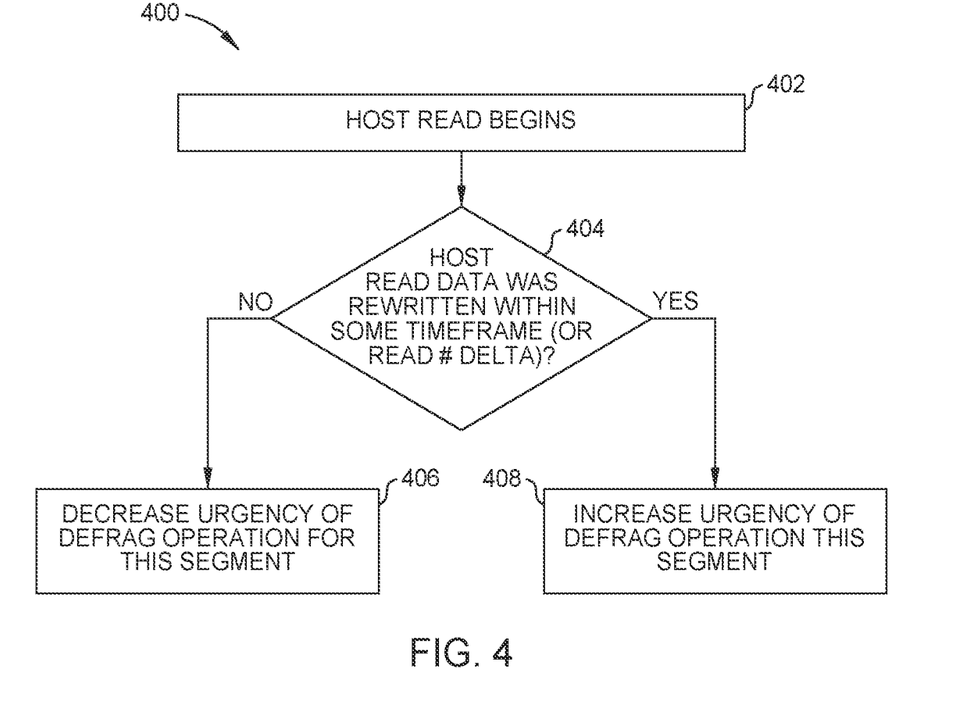
FIG. 4 is a flowchart illustrating frequency of host reads of rewritten data logging according to one embodiment.

FIG. 4 is a flowchart 400 illustrating frequency of host reads of rewritten data logging according to one embodiment. The host read begins at 402. A determination is made regarding whether the host read data was rewritten within a predetermined timeframe or if a predetermined number of reads have occurred at 404. If outside the predetermined timeframe or if the predetermined number of reads has not occurred, then the urgency of the defragmentation operation is decreased at 406. If within the predetermined timeframe or if the predetermined number of reads has occurred, then the urgency of the defragmentation operation is increased at 408.

Figure 5:
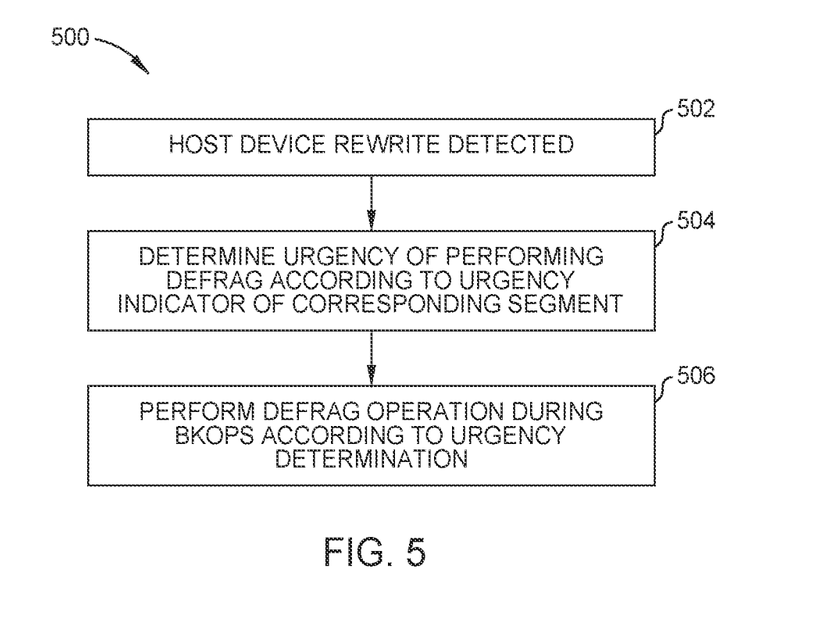
FIG. 5 is a flowchart illustrating timing of defragmentation according to urgency detection according to one embodiment.

FIG. 5 is a flowchart 500 illustrating timing of defragmentation according to urgency detection according to one embodiment. The determination of the triggering of the update of the defragmentation operation is shown in FIG. 5. The urgency indicator corresponding to the host rewritten segment is used in the context of FIG. 5. Initially, at 502, a host rewrite is detected. Next, the urgency of performing the defragmentation is determined at 504 according to the urgency indicator of the corresponding segment. Then, the defragmentation operation is performed at 506 during BKOPS according to the urgency determination.

Figure 6:
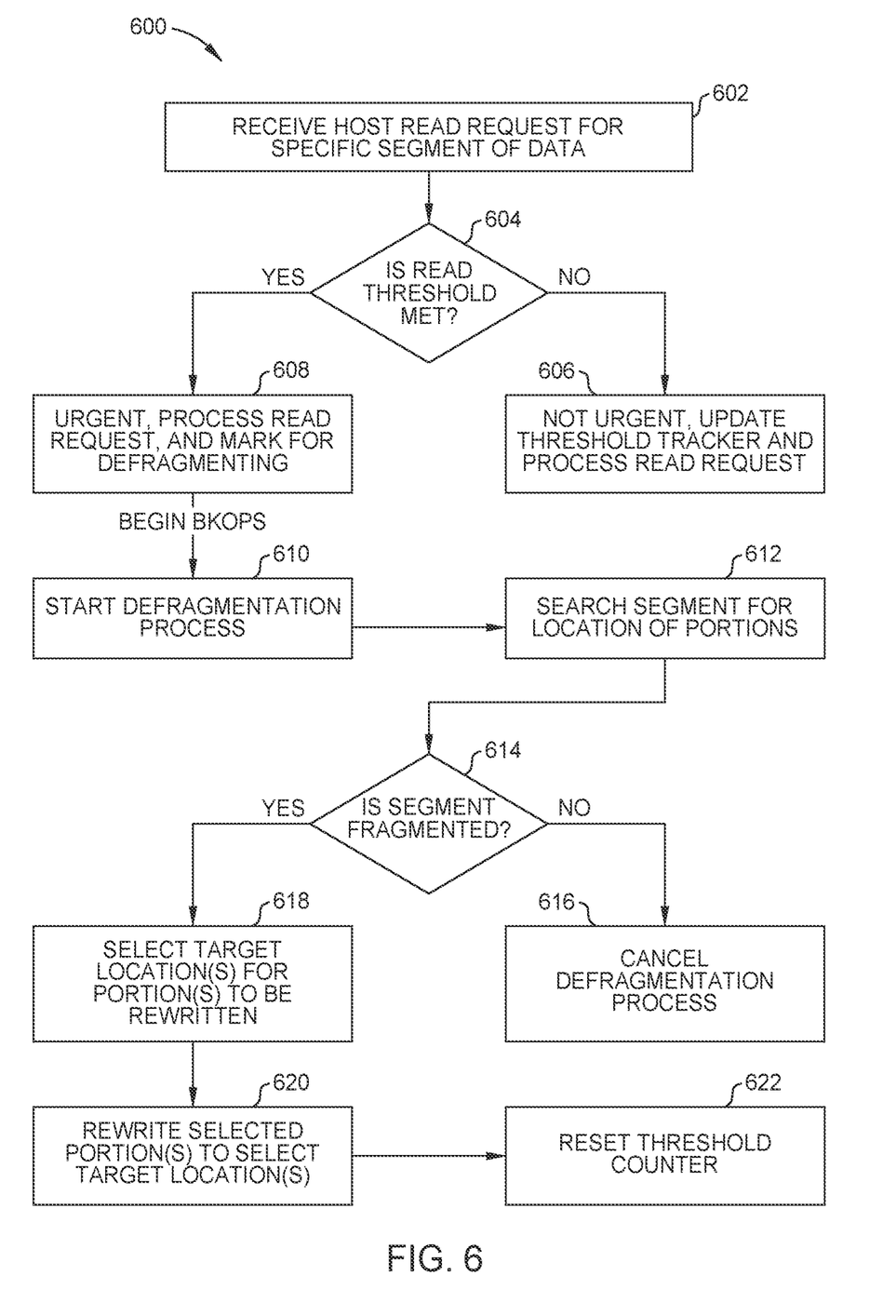
FIG. 6 is a flowchart illustrating data defragmentation according to one embodiment.

FIG. 6 is a flowchart 600 illustrating data defragmentation according to one embodiment. Initially, a host read request for a specific segment of data is received at 602. A determination is made regarding whether a read threshold has been met at 604. The read threshold may be a number of times the specific segment of data has been read or a distance in time from when the data was written to the current location. If the read threshold has not be met, then at 606, defragmentation of the segment is not urgent. Therefore, the threshold tracker is updated and the read request is processed at 606.

If the read threshold has been met at 604, then the specific segment is marked as urgent for defragmentation and the read request is processed at 608. Once BKOPS begin after processing the read request, the defragmentation process begins at 610 during BKOPS. A search is conducted to find the locations in the memory device of the data storage device for the portions of the specific segment at 612. Based upon the searching, a determination is made regarding whether the specific segment is fragmented at 614. If the segment is not fragmented at 614 (i.e., the data is sequentially written and need not be moved), then the defragmentation process is cancelled at 616.

If the specific segment is fragmented at 614, then one or more target locations are selected as needed for the one or more portions that need to be rewritten at 618. The one or more portions are then rewritten at 620 and the read threshold is reset at 622.

Not all segments are actually fragmented, especially if read immediately after being written. Hence, as illustrated in FIG. 6, simply meeting or exceeding the threshold is not sufficient to cause a defragmentation process. Rather, if the data is not fragmented, then the data is theoretically already in the best position for a sequential read operation. Of course, it is contemplated that the data could still be moved if it is determined that a parallel read operation across multiple dies would reduce latency and increase QoS. It is also contemplated that to reduce latency further, the data storage device will only perform the operation illustrated in FIG. 6 if the data is fragmented and thus separately tracks whether data has been rewritten and hence, fragmented, and then utilizes the threshold only for fragmented data.

For fragmented data, once the defragmentation process is complete, the threshold counter is reset because the now defragmented data is, theoretically, in the location that results in the more efficient location for read latency and QoS. However, over time, and data updates, the segment may become fragmented again and hence need to be defragmented again. Thus, the threshold counter is reset upon completion of the defragmentation.

If the threshold is not met and hence, defragmentation is not urgent, the defragmentation may still occur, but at a later time. When urgent, the defragmentation is prioritized during BKOPS, but when not urgent, is not prioritized and can be performed if there is sufficient time remaining after other BKOPS have occurred.

The location(s) for rewriting the portion(s) of the specific segment may be on the same die or even the same WL or may be spread across multiple dies and/or WLs. The key to the rewriting is to rewrite the portion(s) in the location(s) that results in the lowest read latency. It is to be understood that it is possible that that data is sufficiently defragmented that it would be more beneficial to rewrite the entire segment during garbage collection rather than moving less than the entire segment. Thus, the rewrite of only a portion of the entire segment is especially beneficial between garbage collection operations to maintain high QoS and low read latency.

By effectively predicting host device read patterns, data can be defragmented so that eventual host sequential read requests can be processed with less read latency. Additionally, moving only part of the data rather than rewriting all of the data, ensure lower WA. Thus, QoS is improved.

In one embodiment, a data storage device comprises: a memory device; and a controller coupled to the memory device, wherein the controller is configured to: store sequentially read logical block address (LBA) coordinates in the memory device; mark one or more segments of the sequentially read LBA coordinates as candidates for defragmentation; select one or more candidates from relocation to one or more defragmentation blocks in the memory device; and write the selected one or more candidates to the one or more defragmentation blocks. The marked one or more segments are stored in non-volatile memory. The marked one or more segments are LBA overwrites. The writing comprises writing multiple candidates and wherein the multiple candidates are written to different memory dies of the memory device. The multiple candidates are written to a same plane on the different memory dies. The controller is configured to detect read trends of a host device. The one or more defragmentation blocks are selected based upon the detected read trends. The one or more segments are sized to reflect a size of data chunks read by a host device. The writing occurs to a same die and plane from which the one or more segments are marked.

In another embodiment, a data storage device comprises: a memory device; and a controller coupled to the memory device, wherein the controller is configured to: monitor a host device's read pattern; record the host device's common data read length pattern; utilize the recorded host device's read length pattern to set defragmentation granularity; and defragment data stored in the memory device. The recording comprises maintaining a histogram of each data segment read. The histogram indicates a number of reads of each length. The controller is configured to detect a logical block address (LBA) overwrite has occurred prior to defragmenting the data. The host device's read length pattern indicates a number of word lines to be relocated during the defragmenting.

In another embodiment, a data storage device comprises: memory means; and a controller coupled to the memory means, wherein the controller is configured to: detect a pattern of host device read requests; log host device access rate to data; and defragment the data based upon the detected pattern. The detecting a pattern comprises determining whether the host device provides read requests within a threshold timeframe. A timing of the defragmentation is based upon the detected pattern. The controller is configured to detect a rewrite request of the host device. The defragmenting comprises rewriting segments of the data to other locations of the memory means, wherein the segments are sized based upon the detected host device read requests. The defragmenting comprises rewriting data that has been overwritten, wherein the data that has been overwritten is a part of a larger data segment, wherein only the data that has been overwritten is rewritten to a new location in the memory means, and wherein other data of the larger data segment remains in place in the memory means.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
    a memory device; and
    a controller coupled to the memory device, wherein the controller is configured to:
        store sequentially read logical block address (LBA) coordinates in the memory device;
        mark one or more segments of the sequentially read LBA coordinates as candidates for defragmentation;
        select one or more candidates from relocation to one or more defragmentation blocks in the memory device;
        write the selected one or more candidates to the one or more defragmentation blocks;
        mark the one or more segments as urgent for defragmentation and process a read request; and
        begin background operations (BKOPS) after processing the read request, wherein the defragmenting begins during BKOPS.

2. The data storage device of claim 1, wherein the marked one or more segments are stored in non-volatile memory.

3. The data storage device of claim 1, wherein the marked one or more segments are LBA overwrites.

4. The data storage device of claim 1, wherein the writing comprises writing multiple candidates and wherein the multiple candidates are written to different memory dies of the memory device.

5. The data storage device of claim 4, wherein the multiple candidates are written to a same plane on the different memory dies.

6. The data storage device of claim 1, wherein the controller is configured to detect read trends of a host device.

7. The data storage device of claim 6, wherein the one or more defragmentation blocks are selected based upon the detected read trends.

8. The data storage device of claim 1, wherein the one or more segments are sized to reflect a size of data chunks read by a host device.

9. The data storage device of claim 1, wherein the writing occurs to a same die and plane from which the one or more segments are marked.

10. A data storage device, comprising:
    a memory device; and
    a controller coupled to the memory device, wherein the controller is configured to:
        monitor a host device's read length pattern;
        record the host device's read length pattern;
        utilize the recorded host device's read length pattern to set defragmentation granularity;
        defragment data stored in the memory device;
        mark one or more segments as urgent for defragmentation and process a read request; and
        begin background operations (BKOPS) after processing a read request, wherein the defragmenting begins during BKOPS.

11. The data storage device of claim 10, wherein the recording comprises maintaining a histogram of each data segment read.

12. The data storage device of claim 11, wherein the histogram indicates a number of reads of each length.

13. The data storage device of claim 10, wherein the controller is configured to detect a logical block address (LBA) overwrite has occurred prior to defragmenting the data.

14. The data storage device of claim 10, wherein the host device's read length pattern indicates a number of word lines to be relocated during the defragmenting.

15. A data storage device, comprising:
    memory means; and
    a controller coupled to the memory means, wherein the controller is configured to:
        detect a pattern of host device read requests;
        log host device access rate to data;
        defragment the data based upon the detected pattern;
        mark one or more segments as urgent for defragmentation and process a read request; and
        begin background operations (BKOPS) after processing a read request, wherein the defragmenting begins during BKOPS.

16. The data storage device of claim 15, wherein detecting a pattern comprises determining whether the host device provides read requests within a threshold timeframe.

17. The data storage device of claim 15, wherein a timing of the defragmentation is based upon the detected pattern.

18. The data storage device of claim 15, wherein the controller is configured to detect a rewrite request of the host device.

19. The data storage device of claim 15, wherein the defragmenting comprises rewriting segments of the data to other locations of the memory means, wherein the segments are sized based upon the detected host device read requests.

20. The data storage device of claim 15, wherein the defragmenting comprises rewriting data that has been overwritten, wherein the data that has been overwritten is a part of a larger data segment, wherein only the data that has been overwritten is rewritten to a new location in the memory means, and wherein other data of the larger data segment remains in place in the memory means.

* * * * *